(12) United States Patent
Yoshimi et al.

(10) Patent No.: US 8,057,779 B2
(45) Date of Patent: Nov. 15, 2011

(54) PROCESS FOR PRODUCTION OF IODINE PENTAFLUORIDE

(75) Inventors: Hitoshi Yoshimi, Osaka (JP); Tatsuya Hirata, Osaka (JP); Tomohiro Isogai, Osaka (JP); Takashi Shibanuma, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 148 days.

(21) Appl. No.: 12/446,373

(22) PCT Filed: Oct. 18, 2007

(86) PCT No.: PCT/JP2007/070357
§ 371 (c)(1),
(2), (4) Date: Jun. 2, 2009

(87) PCT Pub. No.: WO2008/047871
PCT Pub. Date: Apr. 24, 2008

(65) Prior Publication Data
US 2010/0166638 A1    Jul. 1, 2010

(30) Foreign Application Priority Data
Oct. 20, 2006    (JP) .................. 2006-285733

(51) Int. Cl.
*C01B 7/24* (2006.01)
(52) U.S. Cl. ........................ 423/466; 423/489
(58) Field of Classification Search ............. 423/466, 423/489
See application file for complete search history.

(56) References Cited

U.S. PATENT DOCUMENTS

| 2,904,403 | A | * | 9/1959 | Smith ........................ 423/466 |
| 3,097,067 | A | * | 7/1963 | Fawcett et al. ............... 423/466 |
| 3,367,745 | A |   | 2/1968 | Tepp |
| 4,108,966 | A |   | 8/1978 | Lileck |
| 6,239,319 | B1 | * | 5/2001 | Otsuka et al. ................. 570/170 |

FOREIGN PATENT DOCUMENTS

| GB | 1326130 | 8/1973 |
| JP | 47-3164 A | 2/1972 |
| JP | 54-65196 A | 5/1979 |
| JP | 58-145602 A | 8/1983 |

* cited by examiner

*Primary Examiner* — Ngoc-Yen Nguyen
(74) *Attorney, Agent, or Firm* — Birch, Stewart, Kolasch & Birch LLP

(57) ABSTRACT

There is provided a process for the production of iodine pentafluoride which avoids the problems of the production process of iodine pentafluoride of the prior art as much as possible, and which carries out the reaction of fluorine and iodine moderately, so that iodine pentafluoride is produced more safely and more productively. In the process for the production of iodine pentafluoride by reacting fluorine and iodine, fluorine is supplied to the gas phase 14 which is adjacent to the liquid phase 12 of iodine pentafluoride which contains iodine.

11 Claims, 1 Drawing Sheet

[Fig. 1]
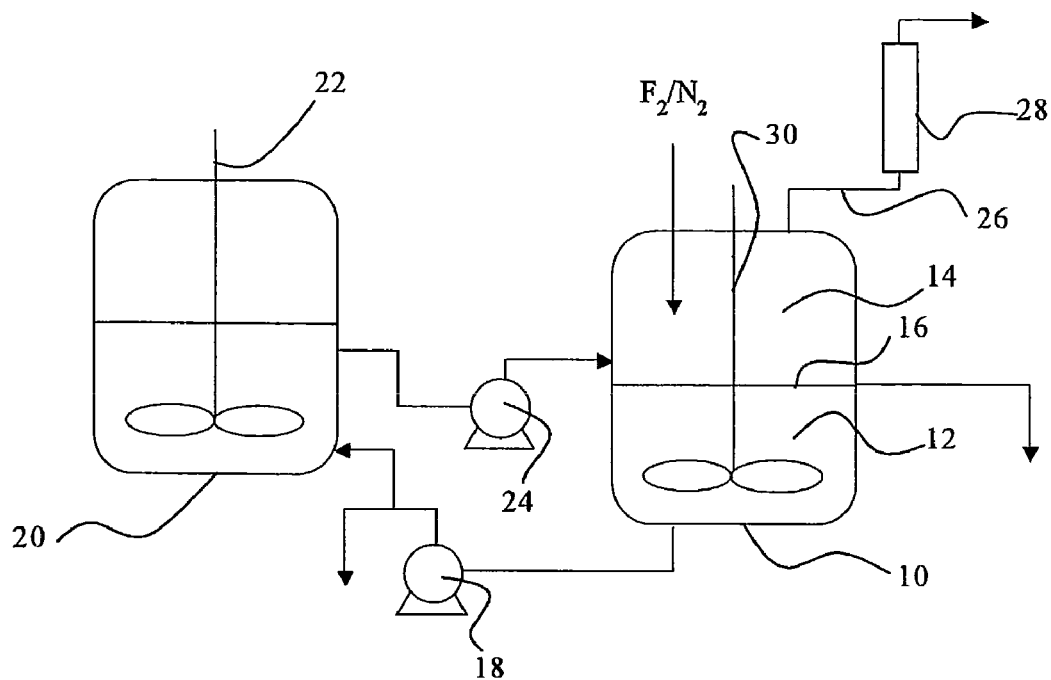

PROCESS FOR PRODUCTION OF IODINE PENTAFLUORIDE

TECHNICAL FIELD

The present invention relates to a process for the production of iodine pentafluoride ($IF_5$) by reacting iodine and fluorine. Iodine pentafluoride is useful as a raw material for the production of an intermediate of a reactive fluorinating agent or a fluorine-containing compound.

BACKGROUND ART

As a process for the production of iodine pentafluoride by reacting iodine and fluorine, the followings are exemplified: A counter current contacting process of fluorine with iodine dissolved in iodine pentafluoride (see Patent Reference 1); and a bubbling process of fluorine into molten iodine or slurry iodine (see Patent References 2 and 3).

In the above processes, fluorine is supplied to a liquid phase, and sublimation of iodine is accelerated by nitrogen used as a diluting gas for the fluorine supply, unreacted fluorine and the like. As a result, iodine deposits and becomes solid onto an inside of an outlet line of a reactor, which ultimately may lead to clogging of the line. An operation of the reactor at an elevated temperature for the purpose of avoiding such iodine deposition is difficult.

Heat of formation of iodine pentafluoride is as large as 920 kJ/mol, and it is likely that solid iodine depositing to the line reacts with fluorine so that temperature increase locally happens. Thus, those processes are industrially not so useful from a viewpoint of the safety.

In addition, fluorine and iodine are very reactive. When fluorine becomes in contact with concentrated iodine such as the slurry iodine, or the molten iodine, there is a risk in that they react explosively, so that there leads to a risk in that iodine flows back to a fluorine supply line. If fluorine goes back to its supply line, fluorine and iodine reacts in such line, and the temperature in the line is locally and rapidly increased, which leads to a risk in that the line, an apparatus related thereto and the like are damaged.

Particularly, with reaction heat removal by means of sensible heat using an indirect heat exchanger (such as an outside jacket) which is conventionally used for the removal of the reaction heat in a reactor, an amount of heat which can be effectively removed is too small compared with the heat formed by the reaction, so that control of the reaction temperature is difficult. Upon scale-up of the reactor, there is a risk in that runway of the reaction, and further explosion may occur.

Alternatively, there is a process in which a fluorine gas is passed over molten iodine so as to react them, so that a vapor mixture which contains iodine pentafluoride and iodine is obtained, and said vapor mixture and fresh fluorine gas are reacted in the presence of liquid iodine pentafluoride which has been already formed so that iodine pentafluoride is further formed (see Patent Reference 4).

Although this process has an advantage in that the reaction heat is effectively used for keeping iodine in its liquid state, an advanced reaction control technique is required so as to avoid reaction runaway and the explosion due to great heat generation of the reaction. Further, since there is a risk in that line clogging by means of sublime iodine, this process is not necessarily satisfactory for the industrial process.
Patent Reference 1: U.S. Pat. No. 3,367,745
Patent Reference 2: Japanese Patent Kokai Publication No. 65196/1979
Patent Reference 3: G.B. Patent No. 1326130
Patent Reference 4: Japanese Patent Kokai Publication No. 145602/1983

DISCLOSURE OF INVENTION

Problem to be Solved by the Invention

The problem to be solved by the invention is to avoid the above mentioned problems in the conventional production process of the iodine pentafluoride as much as possible and to provide a process for the production of iodine pentafluoride in which the reaction of fluorine and iodine proceeds moderately, and therefore more safely and also more productively.

Means to Solve the Problem

The inventors made extensive studies, and have found that the above problem is solved by arranging and using a reaction system wherein iodine pentafluoride which contains iodine is present as a liquid phase in a reactor, and a fluorine is present in a gas phase which is adjacent to the liquid phase, so that the present invention has been achieved.

It is noted that supply of fluorine to the reactor is usually carried out continuously, but fluorine may be supplied intermittently in an amount which corresponds to an amount of fluorine which has been consumed by the reaction. As to the liquid phase which is present in the reactor, it may be kept in the reactor as it is, or iodine of which amount corresponds to an amount of iodine consumed by the reaction may be supplied continuously or intermittently to the reactor as a mixture with iodine pentafluoride. Further, since iodine pentafluoride is formed through the reaction, iodine pentafluoride of which amount corresponds to an amount of formed iodine pentafluoride may be discharged from the reactor continuously or intermittently.

When using the reaction system in which the liquid phase and the gas phase are adjacent to one another as described above, fluorine and iodine are in contact and react with one another so that iodine pentafluoride is formed in the following:

(a) gas phase reaction in which iodine present in the iodine pentafluoride liquid phase transfers into the gas phase from the liquid phase, and contacts with and reacts with fluorine present in the gas phase;

(b) liquid phase reaction in which fluorine present in the gas phase transfers into iodine pentafluoride as the liquid phase, and contacts with and reacts with iodine present in the iodine pentafluoride liquid phase; and (c) interface reaction between the gas phase and the liquid phase in which fluorine present in the gas phase contacts with and reacts with iodine present in the iodine pentafluoride liquid phase.

It is noted that the mechanism through which fluorine present in the gas phase transfers into the iodine pentafluoride as the liquid phase and also the mechanism through which iodine present in the iodine pentafluoride liquid phase transfers into the gas phase are not particularly limited, and for example such transfer happens as a result of diffusion, evaporation, sublimation or the like of iodine or fluorine.

Thus, the present invention provides a process for the production of iodine pentafluoride by reacting fluorine and iodine, characterized in that fluorine is supplied to the gas phase which is adjacent to the iodine pentafluoride liquid phase which contains iodine. When fluorine is supplied in such way, fluorine and iodine are contact with and react with one another via at least the reaction (a) of the above reactions (a) to (c), so that iodine pentafluoride is formed. It is of course possible that the other reactions (b) and/or (c) occur simultaneously.

It is noted that the term "gas phase" used in the present specification does not include bubble(s) present in the liquid phase, so that the supply of fluorine to the liquid phase by means of bubbling does not correspond to "fluorine is supplied to the gas phase." It is intended to mean that "fluorine is supplied to the gas phase" is supplying fluorine to the gas phase which exists adjacently to and above the liquid phase, that is, supplying fluorine to the space above the liquid phase, so that fluorine thus supplied forms the gas phase (together with an inert gas mentioned below if necessary).

The liquid phase of iodine pentafluoride which contains iodine is in the state of a solution in which iodine is dissolved, or in the state of a slurry in which iodine (which is solid or liquid) is dispersed (preferably in the form of fine droplets or particles). That is, sine iodine dissolves in liquid iodine pentafluoride, the liquid phase of iodine pentafluoride which contains iodine is in the state of the solution when an amount of iodine present in iodine pentafluoride corresponds to an amount which is smaller than its saturation solubility in the iodine pentafluoride. On the other hand, when an amount of iodine present in the iodine pentafluoride is greater than the saturation solubility, iodine pentafluoride which contains dissolved iodine is present as the liquid phase and not dissolved iodine (which is liquid or solid depending on its temperature) is present in the dispersed state in such solution, which is referred to as the slurry state in the present specification. In the production process according to the present, the liquid phase of iodine pentafluoride which contains the iodine is particularly preferably in the state of the slurry in which liquid iodine is dispersed.

When the liquid phase of iodine pentafluoride which contains the iodine is in the state of the solution, it contains iodine in an amount which is not larger than an amount corresponding to the saturation solubility. The concentration of iodine is not particularly limited, but it preferably contains not smaller than 0.6% by mass of iodine based on the total amount of the liquid phase, and more preferably contains an amount which corresponds to the saturation solubility at the temperature of the liquid phase, for example 1.0% by mass of iodine at a temperature of 45° C.

When the liquid phase of iodine pentafluoride which contains the iodine is in the state of the slurry, it contains iodine in an amount which is larger than an amount corresponding to the saturation solubility. The content of iodine is not particularly limited, but it contains preferably 10 to 40% by mass of iodine, and more preferably 20 to 40% by mass, for example 30 to 40% by mass based on the total amount of the liquid phase (including dispersed iodine).

Effects of the Invention

By supplying fluorine to the gas phase according to the production process of iodine pentafluoride of the present invention, fluorine supplied to the gas phase preferentially reacts with iodine present in the gas phase (that is, the reaction (a) occurs), and residual fluorine if any approaches to the liquid phase or gets into the liquid phase so that it reacts with dissolved and/or dispersed iodine which is present in iodine pentafluoride as the liquid phase (that is, the reaction (b) and/or reaction (c) occurs). Because of such reaction(s), flowing out of unreacted iodine through a line which discharges a gas from the reactor is suppressed, so that the risk of the deposition and solidification of iodine in the line is reduced.

Further, flowing back of iodine to the fluorine supply line which is possible in the production process of iodine pentafluoride of the prior art as well as the problems related to such flowing back can be avoided back due to the fluorine supply to the gas phase. It is noted that the conversion of fluorine supplied to gas phase in the production process of iodine pentafluoride according to the present invention depends on operation conditions. The production process according to the present invention is operated such that the fluorine conversion reaches generally not smaller than 75%, preferably not smaller than 85%, more preferably not smaller than 90%, and particularly preferably not smaller than 95%, for example not smaller than 98% or more by properly selecting the operation conditions (for example, a reaction pressure, a reaction temperature, an amount of supplied fluorine, an extent of stirring if necessary, and an amount of coexistent hydrogen fluoride which will be explained below.

BRIEF DESCRIPTION OF THE DRAWING

FIG. 1 is a flow sheet which schematically shows one embodiment of the production process of iodine pentafluoride according to the present invention.

EXPLANATION OF THE REFERENCE NUMBERS

10 . . . reactor, 12 . . . liquid phase, 14 . . . gas phase, 16 . . . interface, 18 . . . pump, 20 . . . mixing vessel, 22 . . . stirrer, 24 . . . pump, 26 . . . gas discharge line, 28 . . . cooler, and 30 . . . stirrer.

BEST MODE FOR CARRYING OUT THE INVENTION

In one embodiment of the process for the production of iodine pentafluoride, iodine pentafluoride which contains iodine is present as a liquid phase in a reactor. Fluorine is supplied preferably continuously to a gas phase which is located adjacently to the liquid phase, so that a reaction of iodine and fluorine is carried out. No fluorine is supplied directly into said liquid phase.

It is noted that once fluorine has been supplied to the reactor, no additional fluorine may be supplied, but it is generally preferable that fluorine is supplied continuously or intermittently. As to the liquid phase, once the liquid phase has been charged in the reactor, no additional liquid phase may be supplied thereafter. In other embodiment, iodine pentafluoride containing iodine which forms the liquid phase may be continuously or intermittently supplied to the reactor.

That is in one embodiment of the production process of iodine pentafluoride according to the present invention, the both supplies of fluorine and iodine pentafluoride which forms the liquid phase may be carried out batch-wise. In other embodiment, the supply of fluorine is carried out continuously while the supply of iodine pentafluoride forming the liquid phase may be carried out batch-wise (so-called semi-batch process). In a further embodiment, the both supplies of fluorine and iodine pentafluoride which forms the liquid phase may be carried out continuously.

In other embodiment of the production process of iodine pentafluoride according to the present invention, iodine pentafluoride as a medium and solid iodine are mixed in a mixing vessel so as to prepare a mixture beforehand which contains iodine pentafluoride and iodine, and then the mixture is supplied to the reactor and used as the liquid phase. It is noted that iodine pentafluoride in the mixing vessel provides a reaction field, and therefore it may be referred to as "medium." In this case, the mixing and the reaction are carried out in different steps, so that the direct addition of iodine to the reactor can be avoided. As a result, the possibility that fluorine directly contacts with concentrated iodine is greatly reduced, which further increases the safety. For the purpose of such mixing, it is preferable that the mixing vessel is equipped with a stirrer.

In this embodiment, the production process of iodine pentafluoride according to the present invention comprising the steps of:

1) preparing the mixture which contains iodine pentafluoride and iodine by mixing iodine pentafluoride as the medium and the solid iodine in the mixing vessel;

2) supplying said mixture to the reactor as the liquid phase;

3) supplying fluorine to a gas phase which is adjacent to said liquid phase of the reactor (in this step, the supplied fluorine reacts with iodine in the liquid phase so as to produce iodine pentafluoride);

4) discharging the liquid phase from the reactor (in this step, an amount of iodine in the liquid phase has been decreased as a result of the reaction); and 5) obtaining iodine pentafluoride from the discharged liquid phase.

It is noted that when the above steps are continuously carried out so that iodine pentafluoride is produced steadily, an amount of iodine may be added to the mixing vessel correspondingly to the amount of iodine pentafluoride produced in the reactor, and the produced iodine pentafluoride may be discharged from the reactor correspondingly to the amount of the produced iodine pentafluoride so as to remove it from the liquid phase.

It is noted that the prepared mixture may be continuously supplied to the reactor. In this case, it is preferable that the liquid phase is continuously removed from the reactor so as to keep the level of the liquid phase in the reactor. Thus removed liquid phase may be returned to for example the mixing vessel. In this way, the liquid phase is circulated between the reactor and the mixing vessel. During such circulation, an amount of iodine may be added to the mixing vessel correspondingly to the amount of iodine which is consumed through the reaction, and an amount of iodine pentafluoride may be removed from the mixing vessel (or directly from the liquid phase of the reactor) correspondingly to the amount of iodine pentafluoride which is produced through the reaction. Through circulating the liquid phase as described above, concentration distribution or dispersion state of the contents in the mixing vessel and/or the reactor is homogenized by means of mixing effects due to the circulating streams. Particularly in the reactor, there is an advantage that the concentration distributions of the components of the liquid phase in the reactor or the dispersion state of iodine in the reactor become more uniform.

It is noted that the step of obtaining iodine pentafluoride from the discharged liquid phase from the reactor may be carried out in any appropriate manner. For example, the step may be carried out by rectification under a normal pressure.

In a further embodiment according to the present invention, a phase of iodine is present at the bottom of in a reactor while a phase of iodine pentafluoride is present on the phase of iodine. In this embodiment, iodine transfers into the phase of iodine pentafluoride by diffusion, so that the phase of iodine pentafluoride is in the state of the solution, which may be used as the liquid phase of iodine pentafluoride in the present invention. The phase of iodine present at the bottom may be solid iodine, but it is preferably molten iodine, that is, a phase of liquid iodine since diffusion of iodine into the phase of iodine pentafluoride is accelerated.

In other embodiment of the process for the production of iodine pentafluoride according to the present invention, iodine pentafluoride forming the liquid phase adjacent to the gas phase to which fluorine is supplied may further contains hydrogen fluoride. When iodine pentafluoride contains hydrogen fluoride, an amount of iodine which is dissolved in the liquid phase is increased, so that the reaction proceeds effectively.

When a batch-wise process is employed in the process for the production of iodine pentafluoride according to the present invention, an amount of iodine pentafluoride in the liquid phase increases so that a concentration of hydrogen fluoride decreases if no hydrogen fluoride is added halfway. Even considering such decrease, it is preferably to keep the concentration of hydrogen fluoride of the liquid phase in the reactor in the range for example between 1.0 and 50.0% by mass, and particularly between 2.0 and 20.0% by mass based on the total amount of the liquid phase (i.e. the total amount of $IF_5$, HF and $I_2$ provided that dispersed iodine if any is included) during the reaction, and more preferably in the range between 5 and 15% by weight. When the concentration of hydrogen fluoride exceeds 10% by mass, iodine solubility decreases gradually. Thus, keeping the concentration of hydrogen fluoride around 10% by mass leads to the effective use of the reactor, which is particularly preferable. It is noted that the concentration of hydrogen fluoride is substantially constant when the production process is carried out steadily, even which case the concentration of hydrogen fluoride is preferably in the above mentioned ranges.

In the case in which iodine pentafluoride which forms the liquid phase further contains hydrogen fluoride, hydrogen fluoride may be contained in the liquid phase through supplying hydrogen fluoride into the gas phase. In other embodiment, hydrogen fluoride may be directly supplied to the liquid phase, and in a further embodiment, hydrogen fluoride may be supplied to the both of the gas phase and the liquid phase.

When the hydrogen fluoride is supplied to the gas phase, hydrogen fluoride may be supplied as a mixture gas with fluorine, so that hydrogen fluoride supplied to the gas phase may be dissolved into the liquid phase. In this case, the composition of the gas mixture is not particularly limited, but the gas preferably contains hydrogen fluoride in the range between 1.0 and 10% by mass based on the total amount of the mixture gas.

It is noted that the conditions under which fluorine and iodine react are not particularly limited, and conventionally employed conditions for the reaction are also used in the process for the production according to the present invention. Concretely, the temperature condition is a temperature at which the iodine dispersed in the liquid phase can be present as solid or liquid, and for example it is a temperature between 10 and 50° C. There is a possibility at a temperature below such temperature range in that iodine pentafluoride is solidified. There is a possibility at a temperature above such temperature range in that line clogging occurs due to acceleration of sublimation of iodine. Preferable temperature range is between 20 and 40° C., and more preferable temperature range is between 25 and 35° C. As to the reaction pressure, there is no particular limitation thereon, the pressure is such that iodine pentafluoride can be present as the liquid phase. For example, the reaction may be carried out under a pressure for example between 0 and 0.1 m·Ps (gauge pressure), and it is usually carried out under a normal pressure.

Similarly to the above, an apparatus which is conventionally employed for the reaction may be used as the reactor used in the production process according to the present invention. Usually, a vessel type reactor, a condenser equipped reactor or the like which is generally used may be used. It is noted that the reactor is preferably includes a stirring device which accelerates mixing of the liquid phase in the reactor. When the liquid phase is in the state of the slurry, a stirrer as the stirring device is useful since it is able to keep the dispersion state stably.

In the production process according to the present invention, it is preferable that fluorine to be supplied into the gas phase is supplied in its diluted state with a gas which is inert as to the reaction. Usually, nitrogen, helium, argon, carbon tetrafluoride, sulfur hexafluoride, perfluoroethane or the like may be used for dilution. The dilution ratio is not particularly limited, and for example fluorine is diluted such that a volume of fluorine is in the range between 10 and 95% by volume based on the total volume of the gas to be supplied to the gas phase. When the ratio is smaller than the above range, there is a possibility of productivity reduction due to outflow of iodine pentafluoride or iodine into an outlet line, or decrease in conversion of fluorine. When the ratio is larger than the above range, there is a possibility of back flow of iodine or iodine pentafluoride into the fluorine supply line. In a preferable embodiment, a volume of fluorine contained in the supplied gas is in the range between 20 and 90% by volume, and in a more preferable embodiment, a volume of fluorine contained in the supplied gas is in the range between 30 and 90% by volume, for example between 50 and 90% by volume.

In other embodiment, it is also possible that fluorine and the inert gas are supplied to the reactor separately, so that fluorine is diluted in the gas phase of the reactor. In this case, it is preferable that an amount of fluorine based on the total amount of the supplied fluorine and the inert gas is in the ranges described above.

Then, with reference to the flow sheet of FIG. 1 which schematically shows one example of the production process for iodine pentafluoride according to the present invention, the production process according to the present invention will be described further in detail. According to the production process of the present invention, iodine pentafluoride which contains iodine is present in the reactor 10 as the liquid phase 12, and fluorine and preferably fluorine diluted by nitrogen as shown is supplied to the gas phase 14 which is located above the liquid phase 12. The liquid phase 12 may be in the state of the solution or the slurry as described above.

Fluorine supplied to the gas phase 14 predominantly reacts with iodine present in the gas phase, and a portion of fluorine transfers into the liquid phase 12, where it is able to react with iodine present in the liquid phase. In addition, fluorine present in the gas phase is able to react with iodine present in the gas phase at the interface 16 between the gas phase and the liquid phase.

Iodine pentafluoride which contains iodine may be prepared in for example the mixing vessel 20. Iodine pentafluoride and iodine are charged into the mixing vessel 20, and they are mixed while stirring with the stirrer 22. Thus resulted mixture is supplied to the reactor 10 by means of the pump 24. It is possible that thus prepared mixture is supplied to the reactor 10 as the liquid phase before starting the reaction, and then no mixture may be supplied to the reactor 10. In this case, since fluorine is supplied continuously to the gas phase, iodine pentafluoride is produced semi-batch-wise. When no fluoride is supplied, iodine pentafluoride is produced batch-wise.

In other embodiment, the mixture is continuously or intermittently supplied to the reactor 10, and a portion of the liquid phase is discharged from the reactor 10 by means of the pump 18, so that that portion is directly removed out from the system. In a further embodiment, a portion of the liquid phase is returned to the mixing vessel, from which an amount of the liquid phase may be removed to the outside of the system. In these cases, since iodine pentafluoride is continuously produced, an amount of iodine pentafluoride is gradually increased and therefore it is preferable that an amount of produced iodine pentafluoride is recovered from the reaction system. Further, it is preferable that an amount of iodine which corresponds to an amount of produced iodine pentafluoride is supplied to the mixing vessel. Such recovery of iodine pentafluoride may be carried out in any appropriate manner. For example, a mixture liquid which contains iodine, hydrogen fluoride and iodine pentafluoride is discharged from the reactor or the mixing vessel as an overflow stream, which is subjected to distillation so as to separate and recover iodine pentafluoride.

In one embodiment, the discharged liquid phase may be supplied to the mixing vessel 20, and in this case, the liquid phase is circulated between the reactor 10 and the mixing vessel 20. When the reaction proceeds, an amount of iodine pentafluoride in the liquid phase is increased. Therefore, a portion of the contents of the mixing vessel may be removed from the mixing vessel, and iodine pentafluoride may be recovered from such portion. Also, since iodine is consumed by the reaction, iodine is added to the mixing vessel 20, and the mixture prepared in the mixing vessel may be supplied to the reactor.

In the shown embodiment, fluorine to be supplied is supplied to the gas phase in the diluted state by nitrogen. In the reactor, it is preferable that fluorine reacts with iodine as much as possible, and at least 80%, preferably at least 90%, and more preferably at least 95%, for example at least 98% of the supplied fluorine substantially reacts with iodine. Unreacted fluorine (usually, in a small amount) and nitrogen are discharged from the reactor 10 via a gas discharge line 26. It is noted that the cooler 28 is provided in the line 26 so as to recover accompanied iodine pentafluoride. It is noted that the stirrer 30 may be provided also to the reactor 10, and it is generally preferable to provide the stirrer.

Example 1

Iodine (40 g) and iodine pentafluoride (223 g) were charged in a reactor made of a fluorine resin (PFA) having an inner volume of 150 ml, and stirred so as to prepare a liquid phase in the state of a slurry. Fluorine and nitrogen were supplied to the gas phase of the reactor at flow rates of 50 Ncc/min. and 50 Ncc/min., respectively. The reaction of iodine and fluorine was started while an inside temperature of the reactor was kept at a temperature in the range between 30 and 50° C. by cooling the reactor in an ice bath. The reaction was continued for six hours, and no back stream of iodine into the nitrogen line or the fluorine line was observed, so that the reaction proceeded smoothly. Noncondensed gas discharged from the reactor was analyzed by a ultraviolet-visible spectrophotometer, and it was found that a conversion of fluorine was 98 mol %. The liquid phase in the reactor was composed substantially of iodine pentafluoride, and iodine disappeared.

Comparative Example 1

The liquid phase in the state of the slurry was prepared in the fluorine resin made reactor having an inner volume of 150 ml as in Example 1. A mixture gas of fluorine (50 Ncc/min.) and nitrogen (50 Ncc/min.) was supplied to the liquid phase of the reactor. The reaction of iodine and fluorine was started while an inside temperature of the reactor was kept at a temperature in the range between 30 and 50° C. by cooling the reactor in an ice bath. Four minutes later, iodine in the liquid phase flowed back into the fluorine/iodine line (made of a fluorine resin), and reacted with fluorine in the line. The line is heated to a temperature not smaller than 500° C. due to the reaction heat, so that it was melted and bursted. Since fluorine, iodine and iodine pentafluoride were spilled, the reaction was stopped.

Example 2

Iodine (75 g) and iodine pentafluoride (300 g) were charged and stirred in an autoclave made of a metal (SUS 316) having an inner volume of 200 ml, so that a liquid phase in the state of a slurry was prepared. A mixture gas of fluorine (90 Ncc/min.) and nitrogen (10 Ncc/min.) was supplied to the gas phase of the autoclave, and the reaction of iodine and fluorine was started with stirring at a rotation speed of 500 r.p.m. while an inside temperature of the autoclave was kept at a temperature in the range between 30 and 50° C. by cooling the autoclave in an ice bath. The reaction was continued for seven hours, and no back stream of iodine into the nitrogen/fluorine line was observed, so that the reaction proceeded smoothly. The liquid phase left in the reactor was recovered, all of iodine in the reactor was consumed, and the iodine was absent, and the liquid phase was a transparent and colorless liquid. The liquid was analyzed by 19F-NMR, and it was found that it contained 100 mol % of iodine pentafluoride. Noncondensed gas discharged from the autoclave was analyzed by a ultraviolet-visible spectrophotometer, and it was found that a conversion of fluorine was always not smaller than 98%. After the reaction, there was no deposition of solid iodine on an inner surface of an upper cover of the autoclave or in an outlet line of the autoclave.

Example 3

A liquid phase of a slurry was prepared in an autoclave made of a metal (SUS 316) having an inner volume of 200 ml as in Example 2. A mixture gas of fluorine (180 Ncc/min.) and nitrogen (20 Ncc/min.) was supplied to the gas phase of the autoclave, and the reaction of iodine and fluorine was started with stirring at a rotation speed of 500 r.p.m. while an inside temperature of the autoclave was kept at a temperature in the range between 30 and 50° C. by cooling the autoclave in an ice bath. The reaction was continued for three hours, and no back stream of iodine into the nitrogen/fluorine line was observed, so that the reaction proceeded smoothly. Noncondensed gas discharged from the autoclave was analyzed by a ultraviolet-visible spectrophotometer, and it was found that a conversion of fluorine was always not smaller than 98%. After the reaction, the charged iodine was not completely consumed, and an amount of iodine was left in the autoclave, and there was no deposition of solid iodine on an inner surface of an upper cover of the autoclave or in an outlet line of the autoclave.

Example 4

Iodine (150 g) and iodine pentafluoride (300 g) were charged and stirred in an autoclave made of a metal (SUS 316) having an inner volume of 500 ml and equipped with a cooling tube, so that a liquid phase in the state of a slurry was prepared. The cooling tube was cooled to a temperature of 20° C. A mixture gas of fluorine (450 Ncc/min.) and nitrogen (50 Ncc/min.) was supplied to the gas phase of the autoclave, and the reaction of iodine and fluorine was started while an inside temperature of the autoclave was kept at a temperature in the range between 30 and 50° C. by cooling the autoclave in an ice bath. The reaction was continued for three hours, and no back stream of iodine into the nitrogen/fluorine line was observed, so that the reaction proceeded smoothly. Noncondensed gas discharged from the autoclave was analyzed by a ultraviolet-visible spectrophotometer, and it was found that a conversion of fluorine was always not smaller than 98%. After the reaction, the charged iodine was not completely consumed, and an amount of iodine was left in the autoclave, and there was no deposition of solid iodine on an inner surface of an upper cover of the autoclave, or in the cooling tube or in an outlet line of the autoclave.

Comparative Example 2

As in Example 4, a liquid phase in the state of a slurry was prepared in an autoclave made of a metal (SUS 316) having an inner volume of 500 ml and equipped with a cooling tube, and. The cooling tube was cooled to a temperature of 20° C. A mixture gas of fluorine (450 Ncc/min.) and nitrogen (50 Ncc/min.) was supplied to the liquid phase in the autoclave, and the reaction of iodine and fluorine was started with stirring at a rotation speed of 500 r.p.m. while an inside temperature of the autoclave was kept at a temperature in the range between 30 and 50° C. by cooling the autoclave in an ice bath. The reaction was continued for three hours. Noncondensed gas discharged from the autoclave was analyzed by a ultraviolet-visible spectrophotometer, and it was found that a conversion of fluorine was always not smaller than 98%. After the reaction, the charged iodine was not completely consumed, and an amount of iodine was left in the autoclave. When an inner surface of an upper cover of the autoclave, the cooling tube and an outlet line of the autoclave were visually examined, there were observed depositions of solid iodine in the cooling tube and in the outlet line.

Example 5

Iodine (75 g) and iodine pentafluoride (300 g) were charged and stirred in an autoclave made of a metal (SUS 316) having an inner volume of 200 ml, so that a liquid phase in the state of a slurry was prepared. A mixture gas of fluorine (150 Ncc/min.) and nitrogen (50 Ncc/min.) was supplied to the gas phase of the autoclave, and the reaction of iodine and fluorine was started with stirring at a rotation speed of 300 r.p.m. while an inside temperature of the autoclave was kept at a temperature in the range between 30 and 50° C. by cooling the autoclave in an ice bath. The reaction proceeded smoothly without a back stream of iodine into the nitrogen/fluorine line. Noncondensed gas discharged from the autoclave was analyzed by a ultraviolet-visible spectrophotometer, and it was found that an average conversion of fluorine was 69.6%. After the reaction, there was observed no deposition of solid iodine on an inner surface of an upper cover of the autoclave or in an outlet line of the autoclave.

Example 6

Iodine (75 g) and iodine pentafluoride (300 g) and hydrogen fluoride (14 g) were charged and stirred in an autoclave made of a metal (SUS 316) having an inner volume of 200 ml, so that a liquid phase in the state of a slurry was prepared. Fluorine (150 Ncc/min), nitrogen (25 Ncc/min.), and hydrogen fluoride (25 Ncc/min.) were supplied to the gas phase of the autoclave, and the reaction of iodine and fluorine was started while an inside temperature of the autoclave was kept at a temperature in the range between 30 and 50° C. by cooling the autoclave in an ice bath. The reaction proceeded smoothly and a back stream of iodine into the nitrogen line or the fluorine line was not observed. Noncondensed gas discharged from the autoclave was analyzed by a ultraviolet-visible spectrophotometer, and it was found that an average conversion of fluorine was 84.7%. After the reaction, there was observed no deposition of solid iodine on an inner surface of an upper cover of the autoclave or in an outlet line of the autoclave.

Example 7

As in Example 4, a liquid phase in the state of a slurry was prepared in an autoclave made of a metal (SUS 316) having an inner volume of 500 ml and equipped with a cooling tube, and. The cooling tube was cooled to a temperature of 20° C. A mixture gas of fluorine (670 Ncc/min.) and nitrogen (80 Ncc/min.) was supplied to the gas phase of the autoclave, and the reaction of iodine and fluorine was started with stirring at a rotation speed of 500 r.p.m. while an inside temperature of the autoclave was kept at a temperature in the range between 30 and 50° C. by cooling the autoclave in an ice bath.

A fluorine concentration at an outlet of the gas phase of the autoclave was measured every fifteen minutes and a fluorine conversion was obtained. Also, an $IF_5/I_2$ ratio (molar ratio) of the liquid phase in the autoclave was measured, and the results shown in Table 1 were obtained. It is noted that the reaction proceeded smoothly without a back stream of iodine into the nitrogen/fluorine line, the charged iodine was not completely consumed after the reaction, and an amount of iodine was left in the autoclave. There was no deposition of solid iodine on an inner surface of an upper cover of the autoclave, in the cooling tube or in an outlet line of the autoclave.

TABLE 1

| Reaction Period (min.) | Fluorine Conversion (%) | $IF_5/I_2$ (mol/mol) |
| --- | --- | --- |
| 15 | 98 | 2.7 |
| 30 | 97.6 | 3.6 |
| 45 | 96.4 | 4.9 |
| 60 | 95.8 | 7.0 |
| 75 | 94.8 | 11.0 |
| 90 | 93.2 | 21.0 |
| 105 | 82.6 | 72.5 |

As seen from the results of Table 1, when the reaction period from the reaction start increases, the fluorine conversion decreases, and as a result of the reaction of fluorine and iodine to produce iodine pentafluoride, the $IF_5/I_2$ ratio of the liquid phase in the autoclave increased.

The invention claimed is:

1. A process for the production of iodine pentafluoride by reacting fluorine and iodine which comprises
supplying to a vessel reactor fluorine in a gas phase, wherein the reactor has a stirring device and the fluorine is above, and in contact with iodine pentafluoride in a liquid phase which contains iodine, and
stirring the liquid phase.

2. The process for the production of iodine pentafluoride according to claim 1, wherein the liquid phase iodine pentafluoride is in the state of a solution which contains iodine dissolved therein, or in the state of a slurry which contains iodine dispersed in the liquid phase.

3. The process for the production of iodine pentafluoride according to claim 1, wherein fluorine is continuously supplied in the gas phase.

4. The process for the production of iodine pentafluoride according to claim 1, wherein the liquid phase of iodine pentafluoride which contains iodine is continuously or intermittently supplied to a reactor, and a portion of the liquid phase present in the reactor is discharged from the reactor continuously or intermittently.

5. A process for the production of iodine pentafluoride comprising the steps of:
1) mixing iodine pentafluoride and solid iodine in a mixing vessel so as to prepare a mixture which contains iodine pentafluoride and iodine,
2) supplying said mixture in a liquid phase to a reactor having a stirring device,
3) supplying fluorine in a gas phase above, and in contact with said liquid phase in the reactor so as to react fluorine with iodine in the liquid phase while stirring the liquid phase with the stirring device, so that iodine pentafluoride is formed,
4) discharging the liquid phase from the reactor, and
5) obtaining iodine pentafluoride from the discharged liquid phase.

6. The process for the production of iodine pentafluoride according to claim 1, wherein the liquid phase of iodine pentafluoride which contains iodine further contains hydrogen fluoride.

7. The process for the production of iodine pentafluoride according to claim 6, wherein the liquid phase of iodine pentafluoride which contains iodine contains 1.0 to 20.0% by mass of hydrogen fluoride based on the total of the liquid phase.

8. The process for the production of iodine pentafluoride according to claim 6, wherein hydrogen fluoride is supplied in the gas phase so that the liquid phase contains hydrogen fluoride.

9. The process for the production of iodine pentafluoride according to claim 8, wherein hydrogen fluoride is supplied in the gas phase as a mixture gas with fluorine.

10. The process for the production of iodine pentafluoride according to claim 1, wherein a conversion of fluorine supplied to the gas phase is not smaller than 90%.

11. The process for the production of iodine pentafluoride according to claim 6, wherein hydrogen fluoride is supplied in the liquid phase.

* * * * *